US012431105B2

(12) United States Patent
Cho et al.

(10) Patent No.: US 12,431,105 B2

(45) Date of Patent: Sep. 30, 2025

(54) DISPLAY DEVICE IMPROVING RESPONSE SPEED OF A GATE CLOCK SIGNAL OR ELIMINATING DELAY IN THE GATE CLOCK SIGNAL

(71) Applicant: Samsung Display Co., Ltd., Yongin-si (KR)

(72) Inventors: Dong Beom Cho, Hwaseong-si (KR); Hee Bum Park, Seongnam-si (KR); Dae Sik Lee, Hwaseong-si (KR); Song Yi Han, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/100,971

(22) Filed: Jan. 24, 2023

(65) Prior Publication Data

US 2023/0169934 A1 Jun. 1, 2023

Related U.S. Application Data

(62) Division of application No. 17/132,936, filed on Dec. 23, 2020, now Pat. No. 11,594,196, which is a (Continued)

(30) Foreign Application Priority Data

Feb. 15, 2017 (KR) ........................ 10-2017-0020594

(51) Int. Cl.

*G09G 3/20* (2006.01)

*G09G 3/36* (2006.01)

(Continued)

(52) U.S. Cl.

CPC ........... *G09G 5/008* (2013.01); *G09G 3/2003* (2013.01); *G09G 3/204* (2013.01); *G09G 3/2096* (2013.01);

(Continued)

(58) Field of Classification Search

None

See application file for complete search history.

(56) References Cited

U.S. PATENT DOCUMENTS 7,164,405 B1 * 1/2007 Jeong .................. G09G 3/3688 345/94

2008/0129717 A1 * 6/2008 Lee ...................... G09G 3/3611 345/204

(Continued)

FOREIGN PATENT DOCUMENTS

KR 1020090060083 6/2009

KR 1020100052885 5/2010

(Continued)

*Primary Examiner* — Roberto W Flores

(74) *Attorney, Agent, or Firm* — CANTOR COLBURN LLP

(57) ABSTRACT

A display device includes a display panel including a plurality of pixels which are connected to a plurality of gate lines and a plurality of data lines and display a plurality of consecutive frames of images, a data driver driving the data lines, a gate driver driving the gate lines, a clock generator outputting a gate clock signal, which drives the gate driver and swings between a gate-on voltage and a gate-off voltage, and a signal controller outputting a gate pulse signal which drives the clock generator and a data control signal which controls the data driver. The clock generator includes a voltage maintainer maintaining the gate clock signal at a reference voltage that has a fixed value between the gate-on voltage and the gate-off voltage for a predetermined time.

3 Claims, 13 Drawing Sheets

Related U.S. Application Data division of application No. 15/786,118, filed on Oct. 17, 2017, now abandoned.

(51) Int. Cl.

| | |
|---|---|
| ***G09G 5/00*** | (2006.01) |
| ***G09G 5/18*** | (2006.01) |
| *G09G 3/3266* | (2016.01) |

(52) U.S. Cl.

CPC ............ *G09G 3/3696* (2013.01); *G09G 5/18* (2013.01); *G09G 3/3266* (2013.01); *G09G 3/3677* (2013.01); *G09G 2300/0426* (2013.01); *G09G 2310/0267* (2013.01); *G09G 2310/0272* (2013.01); *G09G 2310/0289* (2013.01); *G09G 2370/08* (2013.01)

(56) References Cited

U.S. PATENT DOCUMENTS

| | | | |
|---|---|---|---|
| 2013/0038587 | A1 | 2/2013 | Song et al. |
| 2013/0082996 | A1 | 4/2013 | Kim et al. |
| 2015/0194121 | A1 | 7/2015 | Lee et al. |
| 2015/0206490 | A1 | 7/2015 | Lim et al. |
| 2016/0179275 | A1 | 6/2016 | Lee et al. |
| 2017/0098422 | A1 | 4/2017 | Lim et al. |
| 2017/0301305 | A1 | 10/2017 | Gao et al. |

FOREIGN PATENT DOCUMENTS

| | | |
|---|---|---|
| KR | 1020100072632 | 7/2010 |
| KR | 1020110067355 | 6/2011 |
| KR | 1020110071672 | 6/2011 |
| KR | 1020120111643 | 10/2012 |
| KR | 1020130057701 | 6/2013 |
| KR | 101319308 | 10/2013 |
| KR | 1020160066636 | 6/2016 |
| KR | 1020160068081 | 6/2016 |

* cited by examiner

DISPLAY DEVICE IMPROVING RESPONSE SPEED OF A GATE CLOCK SIGNAL OR ELIMINATING DELAY IN THE GATE CLOCK SIGNAL

This application is a divisional of U.S. patent application Ser. No. 17/132,936, filed on Dec. 23, 2020, which is a divisional of U.S. patent application Ser. No. 15/786,118, filed on Oct. 17, 2017, which claims priority to Korean Patent Application No. 10-2017-0020594, filed on Feb. 15, 2017, and all the benefits accruing therefrom under 35 U.S.C. § 119, the content of which in its entirety is herein incorporated by reference.

BACKGROUND

1. Field

Exemplary embodiments relate to a display device for displaying an image.

2. Description of the Related Art

It has become preferable to mount a display device on an electronic device as a user interface, and various types of display devices have been developed accordingly. Typically, a liquid crystal display ("LCD") is a device for displaying an image by controlling the amount of light coming from the outside thereof, and an organic light-emitting diode ("OLED") display is a device for displaying an image using a fluorescent organic compound that emits light in response to a current being applied thereto.

In general, a display device includes a display panel for displaying an image and a data driver and a gate driver for driving the display panel. The display panel includes a plurality of gate lines, a plurality of data lines, and a plurality of pixels. The data driver and the gate driver provide voltages for driving the pixels to the data lines and the gate lines, respectively.

SUMMARY

The gate driver may be controlled by a gate clock signal provided by a clock generator. Even though the gate clock signal is required to be maintained at a predetermined voltage during a blank period between consecutive frames that form images displayed on the display device, but may not be able to be consistently maintained at the predetermined voltage because of current leakage. Thus, a structure is desired to maintain the gate clock signal at the predetermined, fixed voltage during the blank period.

Also, a structure is desired to improve the response speed of the gate clock signal and eliminate delays in the gate clock signal.

Exemplary embodiments of the invention provide a display device capable of maintaining a gate clock signal at a predetermined voltage during a blank period.

Exemplary embodiments of the invention provide a display device capable of improving the response speed of a gate clock signal or eliminating delays in the gate clock signal.

However, the invention is not restricted to those set forth herein. The above and other exemplary embodiments of the invention will become more apparent to one of ordinary skill in the art to which the invention pertains by referencing the detailed description of the invention given below.

According to an exemplary embodiment of the invention, a display device includes a display panel including a plurality of pixels which are connected to a plurality of gate lines and a plurality of data lines and display a plurality of consecutive frames of images, a data driver which drives the data lines, a gate driver which drives the gate lines, a clock generator which outputs a gate clock signal which drives the gate driver and swings between a gate-on voltage and a gate-off voltage, and a signal controller which outputs a gate pulse signal, which drives the clock generator and a data control signal which controls the data driver, where the clock generator includes a voltage maintainer which maintains the gate clock signal at a reference voltage that has a fixed value between the gate-on voltage and the gate-off voltage for a predetermined time.

According to another exemplary embodiment of the invention, a display device includes a display panel including a plurality of pixels which are connected to a plurality of gate lines and a plurality of data lines and display a plurality of consecutive frames of images, a data driver which drives the data lines, a gate driver which drives the gate lines, a clock generator which outputs a gate clock signal which drives the gate driver and swings between a gate-on voltage and a gate-off voltage, and a signal controller which outputs a gate pulse signal which drives the clock generator and a data control signal which controls the data driver, where the clock generator includes an impedance control circuit which controls a slew rate of the gate clock signal.

According to still another exemplary embodiment of the invention, a display device includes a display panel including a plurality of pixels which are connected to a plurality of gate lines and a plurality of data lines and display a plurality of consecutive frames of images, a data driver which drives the data lines, a gate driver which drives the gate lines, a clock generator which outputs a gate clock signal which drives the gate driver and swings between a gate-on voltage and a gate-off voltage, and a signal controller which outputs a gate pulse signal which drives the clock generator and a data control signal which controls the data driver, where the clock generator includes an impedance control circuit which delays or advance the gate clock signal.

According to the aforementioned and other exemplary embodiments of the invention, a display device capable of maintaining a gate clock signal at a predetermined voltage during a blank period can be provided.

Also, a display device capable of improving the response speed of a gate clock signal or eliminating a delay in the gate clock signal can be provided.

Other features and exemplary embodiments may be apparent from the following detailed description, the drawings, and the claims to persons of ordinary skill in the art.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
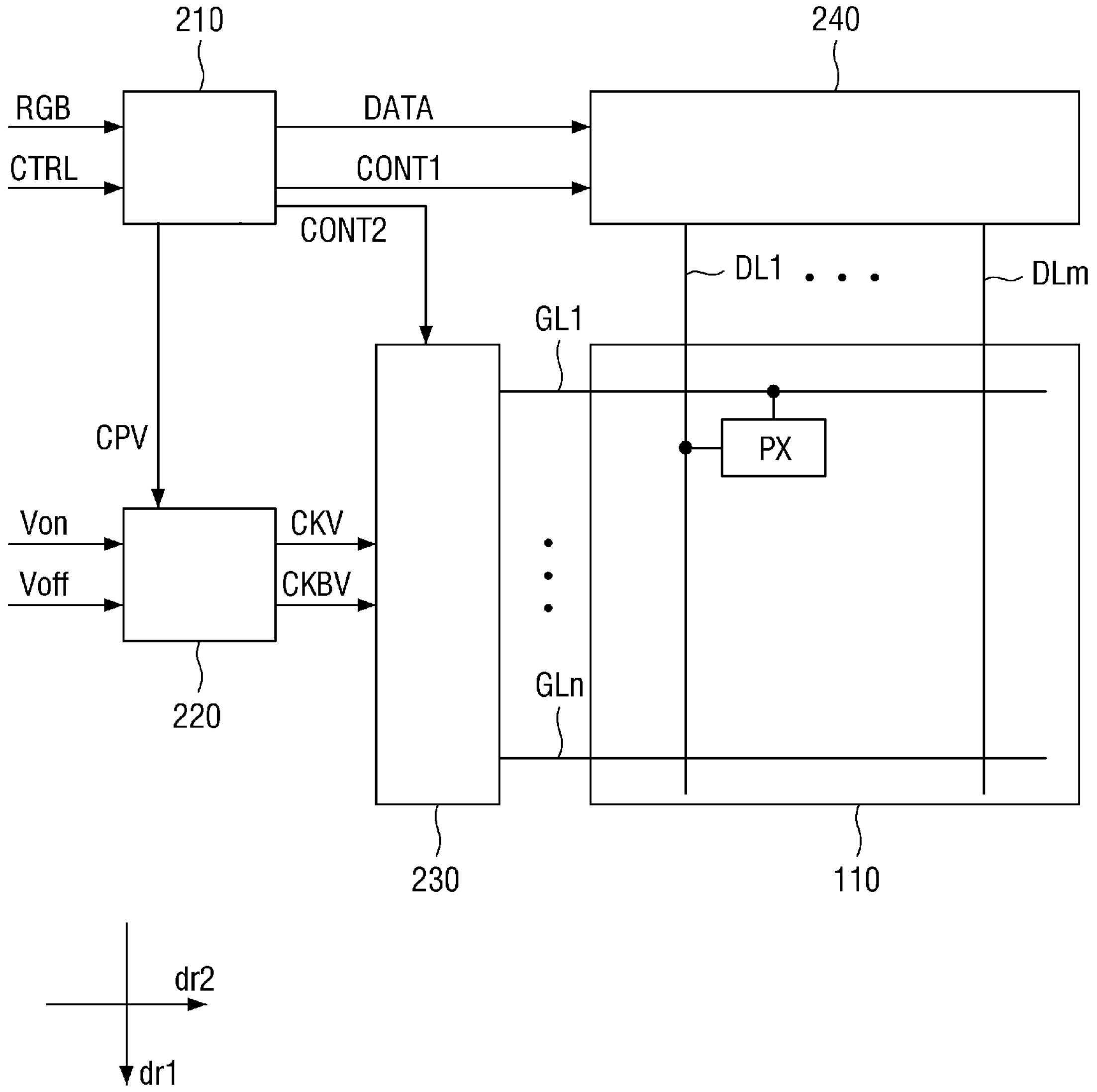
FIG. 1 is a block diagram of an exemplary embodiment of a display device according to the invention.

The invention will now be described more fully hereinafter with reference to the accompanying drawings, in which exemplary embodiments of the invention are shown. This invention may, however, be embodied in different forms and should not be construed as limited to the exemplary embodiments set forth herein. Rather, these exemplary embodiments are provided such that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Hereinafter, exemplary embodiments of the invention will be described with reference to the attached drawings.

FIG. 1 is a block diagram of an exemplary embodiment of a display device according to the invention.

Referring to FIG. 1, the display device according to the exemplary embodiment of FIG. 1 includes a display panel 110, a signal controller 210, a clock generator 220, a gate driver 230, and a data driver 240.

The display panel 110 includes a plurality of data lines DL1 through DLm extending in a first direction dr1 and a plurality of gate lines GL1 through GLn extending in a second direction dr2 to intersect the data lines DL1 through DLm and further includes a plurality of pixels PX arranged in a matrix form at the intersections between the data lines DL1 through DLm and the gate lines GL1 through GLn. The data lines DL1 through DLm and the gate lines GL1 through GLn are insulated from each other.

Although not specifically illustrated, each of the pixels PX includes a switching transistor (not illustrated) connected to one of the data lines DL1 through DLm and one of the gate lines GL1 through GLn, and a liquid crystal capacitor (not illustrated) and a storage capacitor (not illustrated) which are connected to the switching transistor. FIG. 1 illustrates an example in which the pixels of a liquid crystal display ("LCD") are arranged in the display panel 110, but the invention is not limited thereto. That is, in an alternative embodiment, the pixels PX of an organic light-emitting diode ("OLED") display device may be arranged in the display panel 110.

The signal controller 210 receives control signals CTRL for controlling an image signal RGB and controlling the display of the image signal RGB and the control signals CTRL may include, for example, a vertical synchronization signal, a horizontal synchronization signal, a main clock signal, and a data enable signal, from an external source, in an exemplary embodiment. The signal controller 210 outputs a data signal DATA, which is obtained by processing the image signal RGB based on the control signals CTRL to be compatible with the operating conditions of the display panel 110, and a first driving control signal CONT1 to the data driver 240 and provides a second driving control signal CONT2 to the gate driver 230. In an exemplary embodiment, the first driving control signal CONT1 may include a horizontal synchronization start signal, a clock signal, and a line latch signal, and the second driving control signal CONT2 may include a vertical synchronization start signal STV, and an output enable signal, for example. Also, the signal controller 210 provides a gate pulse signal CPV to the clock generator 220.

The data driver 240 generates a gray voltage for driving each of the data lines DL1 through DLm in accordance with the data signal DATA and the first driving control signal CONT1, provided by the signal controller 210.

The clock generator 220 generates a gate clock signal CKV and a gate clock bar signal CKBV in response to the gate pulse signal CPV provided by the signal controller 210, and provides the gate clock signal CKV and the gate clock bar signal CKBV to the gate driver 230. The clock generator 220 may receive a gate-on voltage Von and a gate-off voltage Voff from an external source and may generate the gate clock signal CKV and the gate clock bar signal CKBV based on the gate-on voltage Von and the gate-off voltage Voff.

FIG. 1 illustrates an example in which a pair of clock signals, i.e., the gate clock signal CKV and the gate clock bar signal CKBV, are generated, but the invention is not limited thereto. That is, in an alternative embodiment, two pairs of clock signals, i.e., a first gate clock signal (not illustrated), a second gate clock signal (not illustrated), a first gate clock bar signal (not illustrated), and a second gate clock bar signal (not illustrated), may be generated and may then be provided to the gate driver 230.

The gate driver 230 drives the gate lines GL1 through GLm in response to the second driving control signal CONT2, provided by the signal controller 210, and the gate clock signal CKV and the gate clock bar signal CKBV, provided by the clock generator 220. The gate driver 230 may be implemented not only as a gate driving integrated circuit ("IC"), but also as a circuit using an amorphous silicon thin-film transistor ("a-Si TFT")), an oxide semiconductor, a crystalline semiconductor, or a polycrystalline semiconductor, for example.

Figure 2:
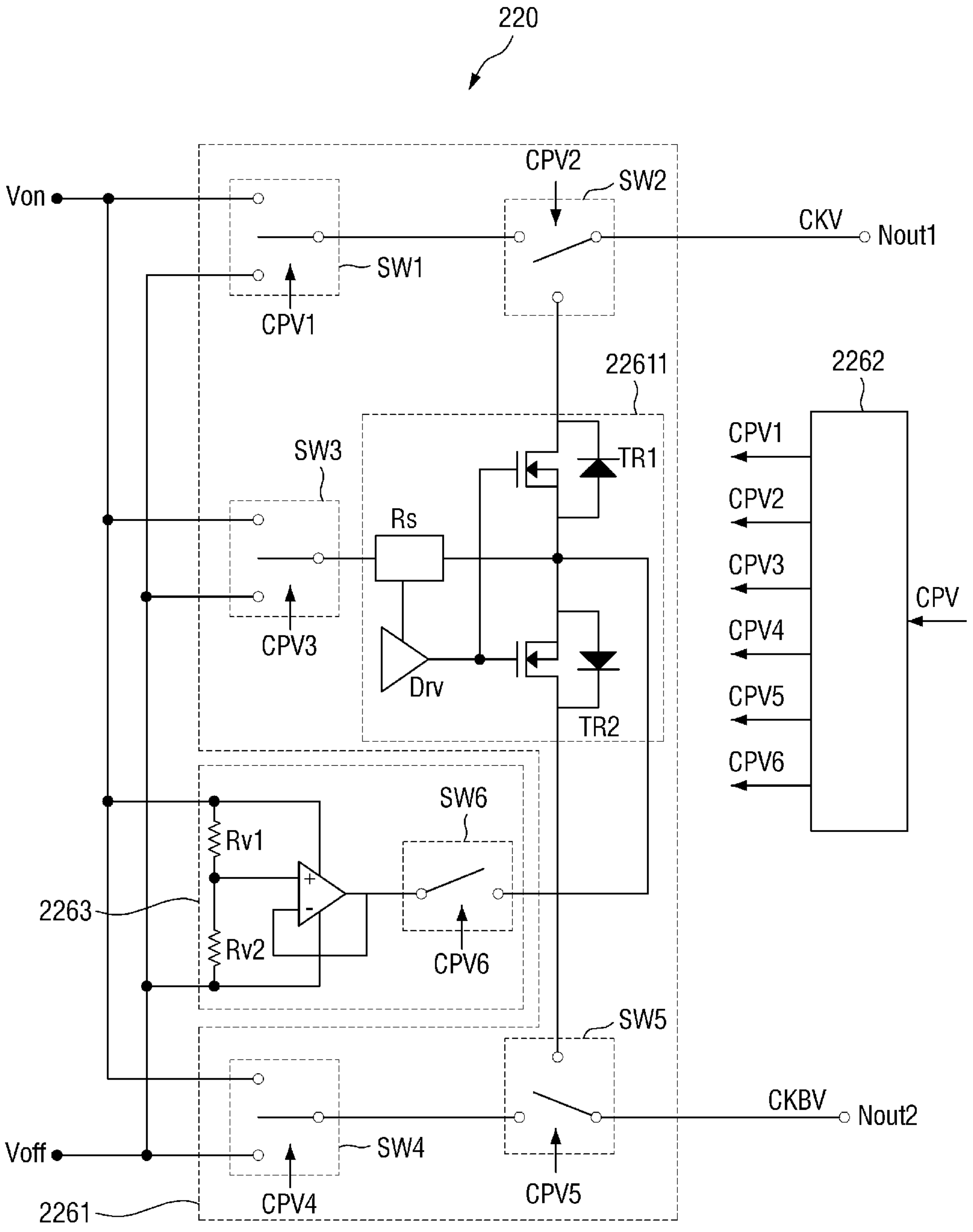
FIG. 2 is a circuit diagram of an exemplary embodiment of a clock generator illustrated in FIG. 1.

FIG. 2 is a circuit diagram an exemplary embodiment of the clock generator illustrated in FIG. 1.

Referring to FIG. 2, the clock generator 220 includes a gate clock generator 2261, a control signal generator 2262, and a voltage maintainer 2263.

The gate clock generator 2261 generates the gate clock signal CKV and the gate clock bar signal CKBV in response to various control signals provided by the control signal generator 2262.

The control signal generator 2262 generates first through sixth gate pulse signals CPV1 through CPV6, which may be used for controlling various switching circuits of the gate clock generator 2261 and the voltage maintainer 2263, in response to the gate pulse signal CPV provided by the signal controller 210.

The voltage maintainer 2263 may generate an arbitrary voltage having a value between the gate-on voltage Von and the gat-off voltage Voff using the gate-on voltage Von and the gat-off voltage Voff and may provide the arbitrary voltage to the gate clock generator 2261.

Specifically, the gate clock generator 2261 includes first through fifth switching circuits SW1 through SW5 and a charge sharer 22611.

The first switching circuit SW1 provides one of the gate-on voltage Von and the gate-off voltage Voff to a first output terminal Nout1 of the clock generator 220 as the gate clock signal CKV through a second switching circuit SW2 in response to the first gate pulse signal CPV1.

The second switching circuit SW2 may either connect the first switching circuit SW1 and the first output terminal Nout1 of the clock generator 220, or connect the charge sharer 22611 and the first output terminal Nout1 of the clock generator 220, in response to the second gate pulse signal CPV2, and then may output the gate clock signal CKV to the first output terminal Nout1.

The third switching circuit SW3 may provide one of the gate-on voltage Von and the gate-off voltage Voff to the charge sharer 22611 in response to the third gate pulse signal CPV3.

The fourth switching circuit SW4 may provide one of the gate-on voltage Von and the gate-off voltage Voff to the second output terminal Nout2 of the clock generator 220 as the gate clock bar signal CKBV through a fifth switching circuit SW5 in response to the fourth gate pulse signal CPV4.

The fifth switching circuit SW5 may either connect the fourth switching circuit SW4 and the second output terminal Nout2 of the clock generator 220, or connect the charge sharer 22611 and the second output terminal Nout2 of the clock generator 220, in response to the fifth gate pulse signal CPV5, and then may output the gate clock bar signal CKBV to the second output terminal Nout2.

The charge sharer 22611 couples the first and second output terminals Nout1 and Nout2 of the clock generator 220 such that the gate clock signal CKV and the gate clock bar signal CKBV output via the first and second output terminals Nout1 and Nout2, respectively, may be matched. To this end, the charge sharer 22611 may include a charge sharing resistor Rs, a first transistor TR1, a second transistor TR2, and a shared amplifier Drv for driving the charge sharing resistor Rs, the first transistor TR1, and the second transistor TR2, but the structure of the charge sharer 22611 is not limited thereto. That is, any circuit configuration that can match the gate clock signal CKV and the gate clock bar signal CKV may be used.

Specifically, the charge sharer 22611 may make the gate clock signal CKV and the gate clock bar signal CKBV swing from the gate-on voltage Von to a reference voltage that ranges between the gate-on voltage Von and the gate-off voltage Voff, or from the gate-off voltage Voff to the reference voltage. The waveforms of the gate clock signal CKV and the gate clock bar signal CKBV will be described later.

The voltage maintainer 2263 includes first and second divider resistors Rv1 and Rv2 dividing a voltage supplied thereto and a sixth switching circuit SW6 providing the divided voltage to the charge sharer 22611 in response to the sixth gate pulse signal CPV6.

The sixth switching circuit SW6 may determine whether to connect the charge sharer 22611 and the voltage maintainer 2263 in response to the sixth gate pulse signal CPV6.

Specifically, the voltage maintainer 2263 may receive the gate-on voltage Von and the gate-off voltage Voff and may output the reference voltage produced by dividing the gate-on voltage Von and the gate-off voltage Voff. The reference voltage may be a fixed voltage at which the gate clock signal CKV and the gate clock bar signal CKBV are required to be maintained during a blank period ("Blank" of FIG. 3) between periods of consecutive frames that form images. During the blank period ("Blank" of FIG. 3), values of the gate clock signal CKV and the gate clock bar signal CKBV can be consistently maintained as the fixed reference voltage by the voltage maintainer 2263 regardless of the occurrence of current leakage, and as a result, the display quality of the display device of FIG. 1 according to the invention can be improved.

In an exemplary embodiment, the reference voltage may have the median value of the gate-on voltage Von and the gate-off voltage Voff, i.e., (Von+Voff)/2, for example. In this example, the first and second divider resistors Rv1 and Rv2 may have the same resistance. If the reference voltage is (Von+Voff)/2, the gate clock signal CKV and the gate clock bar signal CKBV may have the same voltage variation when the blank period ("Blank" of FIG. 3) ends and a subsequent frame begins, and as a result, display quality deterioration such as visible horizontal lines that may appear unintendedly on the display panel 110 can be reduced. This will hereinafter be described later with reference to FIG. 3.

Figure 3:
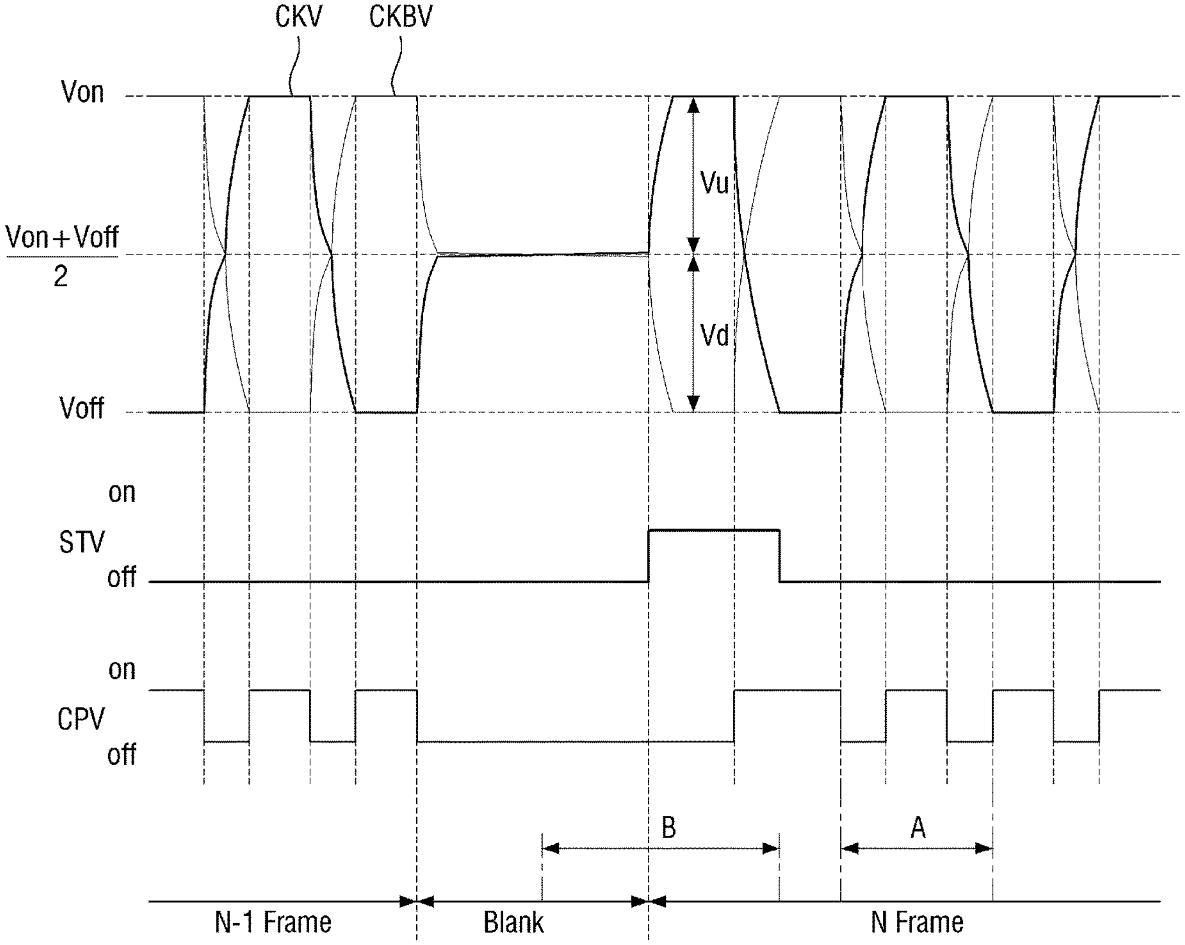
FIG. 3 is a waveform diagram showing an exemplary embodiment of the waveforms of a gate clock signal and a gate clock bar signal during a blank period.

FIG. 3 is a waveform diagram showing an exemplary embodiment of the waveforms of a gate clock signal and a gate clock bar signal during a blank period.

Specifically, FIG. 3 shows an exemplary embodiment of the waveforms of the gate clock signal CKV and the gate clock bar signal CKBV during the latter half of a previous frame "N−1 Frame", the blank period "Blank", and the former half of a current frame "N Frame".

During the previous frame "N−1 Frame", the gate clock signal CKV and the gate clock bar signal CKBV may alternately swing between the gate-on voltage Von and the gate-off voltage Voff depending on whether the gate pulse signal CPV is on or off. The gate clock signal CKV and the gate clock bar signal CKBV may be opposite in phase and may be symmetrical to each other.

During the blank period "Blank" that follows the previous frame "N−1 Frame", the gate pulse signal CPV is maintained to be the "off" status, and as a result, the gate clock signal CKV and the gate clock bar signal CKBV may be matched by the charge sharer 22611 to be maintained at the reference voltage. In this exemplary embodiment, the reference voltage may have the median value of the gate-on voltage Von and the gate-off voltage Voff, i.e., (Von+Voff)/2, for example.

During the blank period "Blank", it is preferable for the gate clock signal CKV and the gate clock bar signal CKBV to be consistently maintained without any change. There is a probability that the levels of the gate clock signal CKV and the gate clock bar signal CKBV may change due to current leakage unless a separate power source is provided. Specifically, in the case that the current leakage exists, at the beginning of the current frame "N Frame", an amplitude Vu at which the gate clock signal CKV swings for the first time and an amplitude Vd at which the gate clock bar signal CKBV swings for the first time may differ from each other, resulting in different charging rates. Also, even the gate driver 230 may be affected and may thus cause unintended horizontal lines to appear on a displayed image.

On the other hand, in the exemplary embodiment of FIG. 2, the clock generator 220 includes the voltage maintainer 2263, and the voltage maintainer 2263 forcibly maintains the gate clock signal CKV and the gate clock bar signal CKBV at the reference voltage during the blank period "Blank". As a result, the display quality deterioration that may be caused by current leakage as mentioned above can be reduced.

In response to the vertical synchronization start signal STV being on, the current frame "N Frame" may begin, and the gate clock signal CKV and the gate clock bar signal CKBV that have been maintained at the reference voltage begin to swing in opposite directions from each other. In the exemplary embodiment of FIG. 2, the amplitudes Vu and Vd are identical, and as a result, the display quality deterioration can be reduced.

Figure 4:
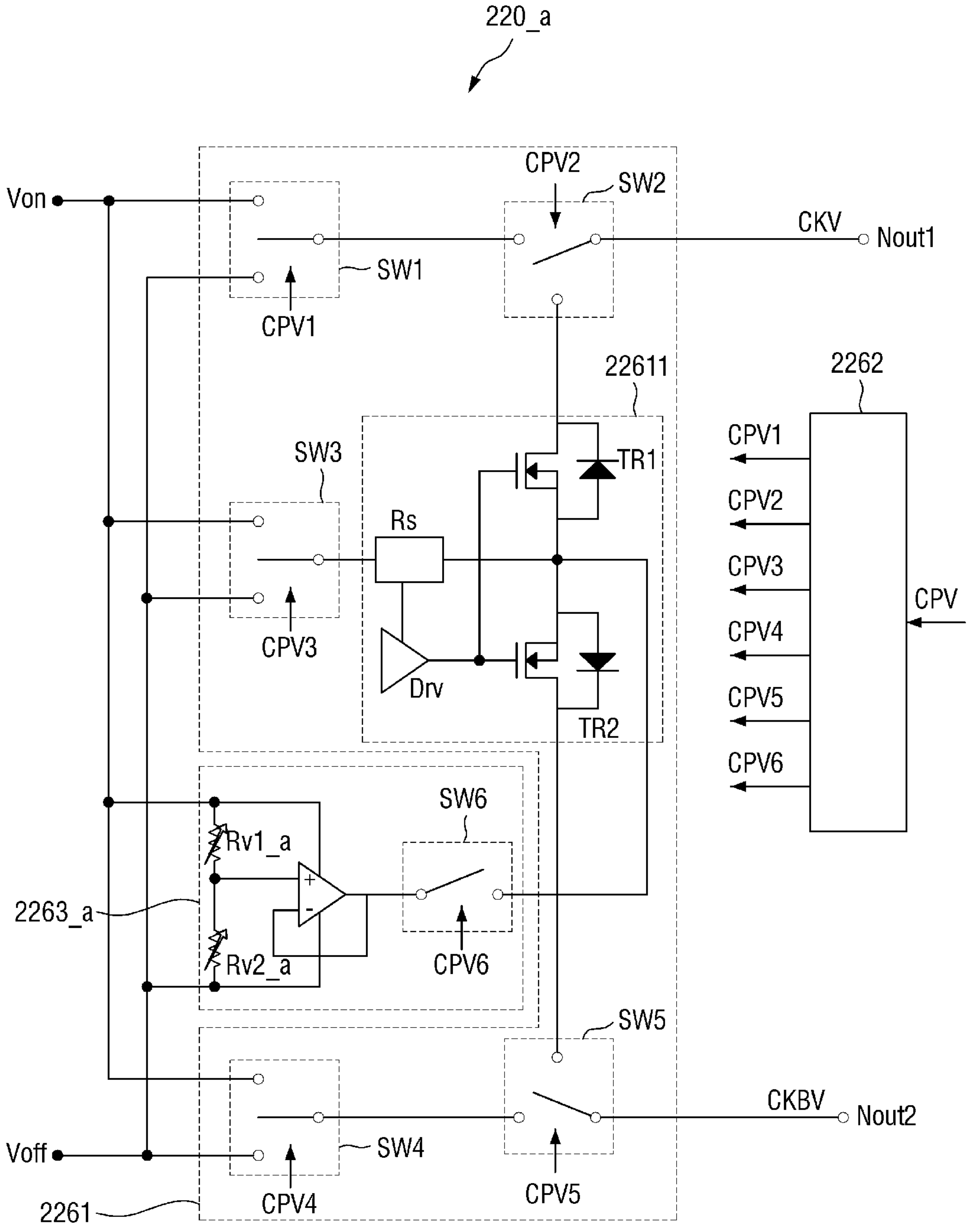
FIG. 4 is a block diagram of another exemplary embodiment of a clock generator of a display device according to the invention.

FIG. 4 is a block diagram of another exemplary embodiment of a clock generator of a display device according to the invention.

A clock generator 220_*a* according to the exemplary embodiment of FIG. 4 has almost the same structure as the clock generator 220 of FIG. 2, except that a voltage sharer 2263_*a* includes variable resistors. Accordingly, the clock generator 220_*a* will hereinafter be described, focusing mainly on the difference from the clock generator 220.

Referring to FIG. 4, the clock generator 220_*a* includes a gate clock generator 2261, a control signal generator 2262, and a voltage maintainer 2263_*a*.

The voltage maintainer 2263_*a* includes first and second divider resistors Rv1_*a* and Rv2_*a* dividing a voltage supplied thereto and a sixth switching circuit SW6 determining whether to provide the divided voltage to the charge sharer 22611.

The first and second divider resistors Rv1_*a* and Rv2_*a*, unlike the first and second divider resistors Rv1 and Rv2 of FIG. 2, may be variable resistors. A reference voltage is determined by the ratio of the resistances of the first and second divider resistors Rv1_*a* and Rv2_*a*. Thus, if the first and second divider resistors Rv1_*a* and Rv2_*a* do not have the same resistance, the reference voltage may have a value other than the median value of a gate-on voltage Von and a gate-off voltage Voff, i.e., (Von+Voff)/2. Accordingly, the degree of freedom of the setting of the reference voltage at which the gate clock signal CKV and the gate clock bar signal CKBV need to be maintained during the blank period "Blank" of FIG. 3 increases, and as a result, the display device according to the exemplary embodiment of FIG. 4 can be driven more effectively.

In the exemplary embodiment of FIG. 4, the first and second divider resistors Rv1_*a* and Rv2_*a* are variable resistors, but the invention is not limited thereto. That is, any circuit configuration that can divide a voltage supplied to an input terminal of the sixth switching circuit SW6 into an arbitrary voltage between the gate-on voltage Von and the gate-off voltage Voff may be used.

Figure 5:
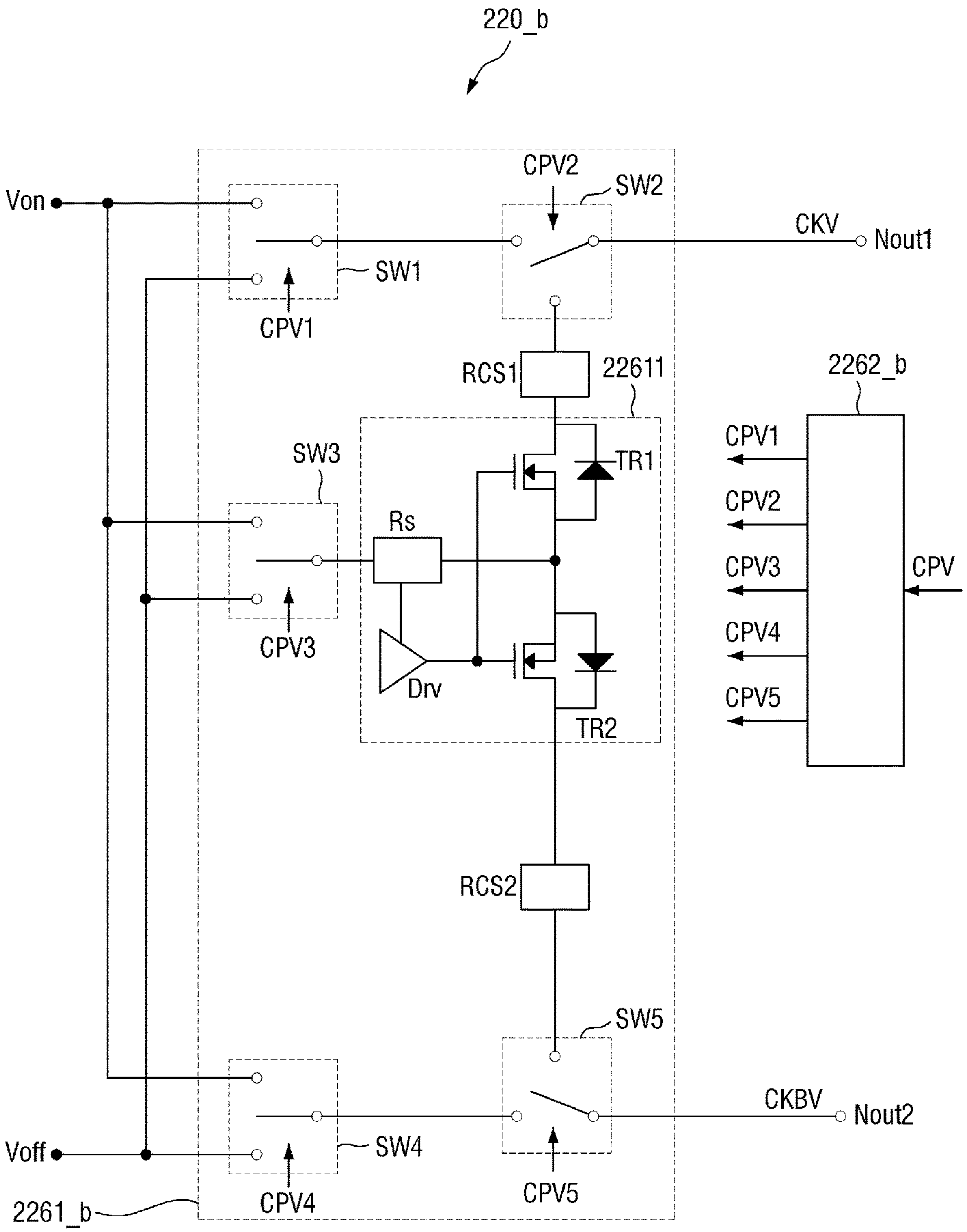
FIG. 5 is a block diagram of still another exemplary embodiment of a clock generator of a display device according to the invention.

FIG. 5 is a block diagram of still another exemplary embodiment of a clock generator of a display device according to the invention.

A clock generator 220_*b* according to the exemplary embodiment of FIG. 5 has almost the same structure as the clock generator 220 of FIG. 2, except that the voltage maintainer 2263 of FIG. 2 is not provided and first and second impedance control circuits RCS1 and RCS2 are additionally provided. Accordingly, the clock generator 220_*b* will hereinafter be described, focusing mainly on the differences from the clock generator 220 of FIG. 2.

Referring to FIG. 5, the clock generator 220_*b* includes a gate clock generator 2261_*b* and a control signal generator 2262_*b*.

The gate clock generator 2261_*b* includes first through fifth switching circuits SW1 through SW5, a charge sharer 22611, and the first and second impedance control circuits RCS1 and RCS2.

The first impedance control circuit RCS1 is connected between the charge sharer 22611 and the second switching circuit SW2. The second impedance control circuit RCS2 is connected between the charge sharer 22611 and the fifth switching circuit SW5.

The first impedance control circuit RCS1 may control the slew rate of a gate clock signal CKV during periods when charge sharing is performed such that the gate clock signal CKV swings from a gate-off voltage Voff to a reference voltage and when charge sharing is performed such that the gate clock signal CKV swings from a gate-on voltage Von to the reference voltage. The slew rate of a signal means the speed at which the signal reaches a desired voltage from any particular voltage. The higher the slew rate of the gate clock signal CKV is, the faster the response speed of the gate clock signal CKV is. Specifically, the higher the impedance of the first impedance control circuit RCS1 is, the lower the slew rate of the gate clock signal CKV is, and the lower the impedance of the first impedance control circuit RCS1 is, the higher the slew rate of the gate clock signal CKV is.

The second impedance control circuit RCS2 may control the slew rate of a gate clock bar signal CKBV during periods when charge sharing is performed such that the gate clock bar signal CKBV swings from the gate-off voltage Voff to the reference voltage and when charge sharing is performed such that the gate clock bar signal CKBV swings from the gate-on voltage Von to the reference voltage. Specifically, the higher the impedance of the second impedance control circuit RCS2 is, the lower the slew rate of the gate clock bar signal CKBV is, and the lower the impedance of the second impedance control circuit RCS2 is, the higher the slew rate of the gate clock bar signal CKBV is.

The gate clock signal CKV of FIG. 5 will hereinafter be described with reference to FIG. 6.

Figure 6:
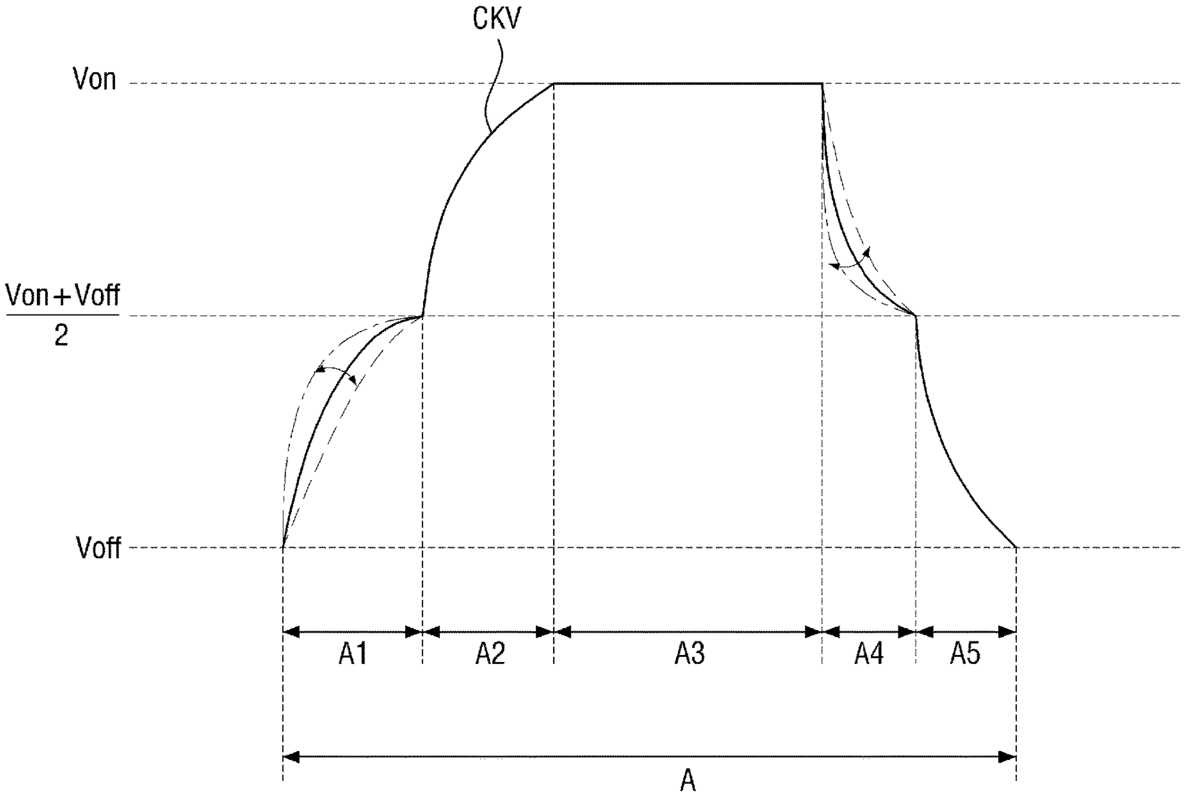
FIG. 6 is a waveform diagram showing an exemplary embodiment of the waveform of a gate clock signal generated by the clock generator of FIG. 5 during a period corresponding to a period A of FIG. 2.

FIG. 6 is a waveform diagram showing an exemplary embodiment of the waveform of the gate clock signal generated by the clock generator of FIG. 5 during a period corresponding to a period A of FIG. 2.

Referring to FIG. 6, a period A may be divided into a total of five sections, i.e., sections A1 through A5, for example. FIG. 6 shows only the gate clock signal CKV, and a detailed description of the gate clock bar signal CKBV will be omitted because the description of the gate clock signal CKV is applicable to the gate clock bar signal CKBV.

The section A1 may be a period during which the gate clock signal CKV maintained at the gate-off voltage Voff swings to the reference voltage (e.g., (Von+Voff)/2) through charge sharing.

The section A2 may be a period during which the gate clock signal CKV swings from the reference voltage to the gate-on voltage Von through charging.

The section A3 may be a period during which the gate clock signal CKV, the gate-on voltage Von, is provided to the gate driver 230 of FIG. 1.

The section A4 may be a period during which the gate clock signal CKV maintained at the gate-on voltage Von swings to the reference voltage through charge sharing.

The section A5 may be a period during which the gate clock signal CKV swings from the reference voltage to the gate-off voltage Voff through charging.

Among the sections A1 through A5, swings of the gate clock signal CKV that result from charge sharing performed by the charge sharer 22611 of FIG. 5 may occur only during the sections A1 and A4.

As the impedance of the first impedance control circuit RCS1 of FIG. 5 decreases, the gate clock signal CKV may increase faster during the section A1, and may decrease faster during the section A4. That is, the response speed, the slew rate, of the gate clock signal CKV may increase. On the other hand, as the impedance of the first impedance control circuit RCS1 of FIG. 5 increases, the gate clock signal CKV may increase more slowly during the section A1, and may decrease more slowly during the section A4. That is, the response speed, the slew rate, of the gate clock signal CKV may decrease.

In an exemplary embodiment, resistors, inductors, capacitors, operational amplifiers, or voltage followers using emitter followers may be used as the first and second impedance control circuits RCS1 and RCS2 of FIG. 5, for example, and any circuit configurations that can provide a desired impedance value may be used as the first and second impedance control circuits RCS1 and RCS2 of FIG. 5.

Figure 7:
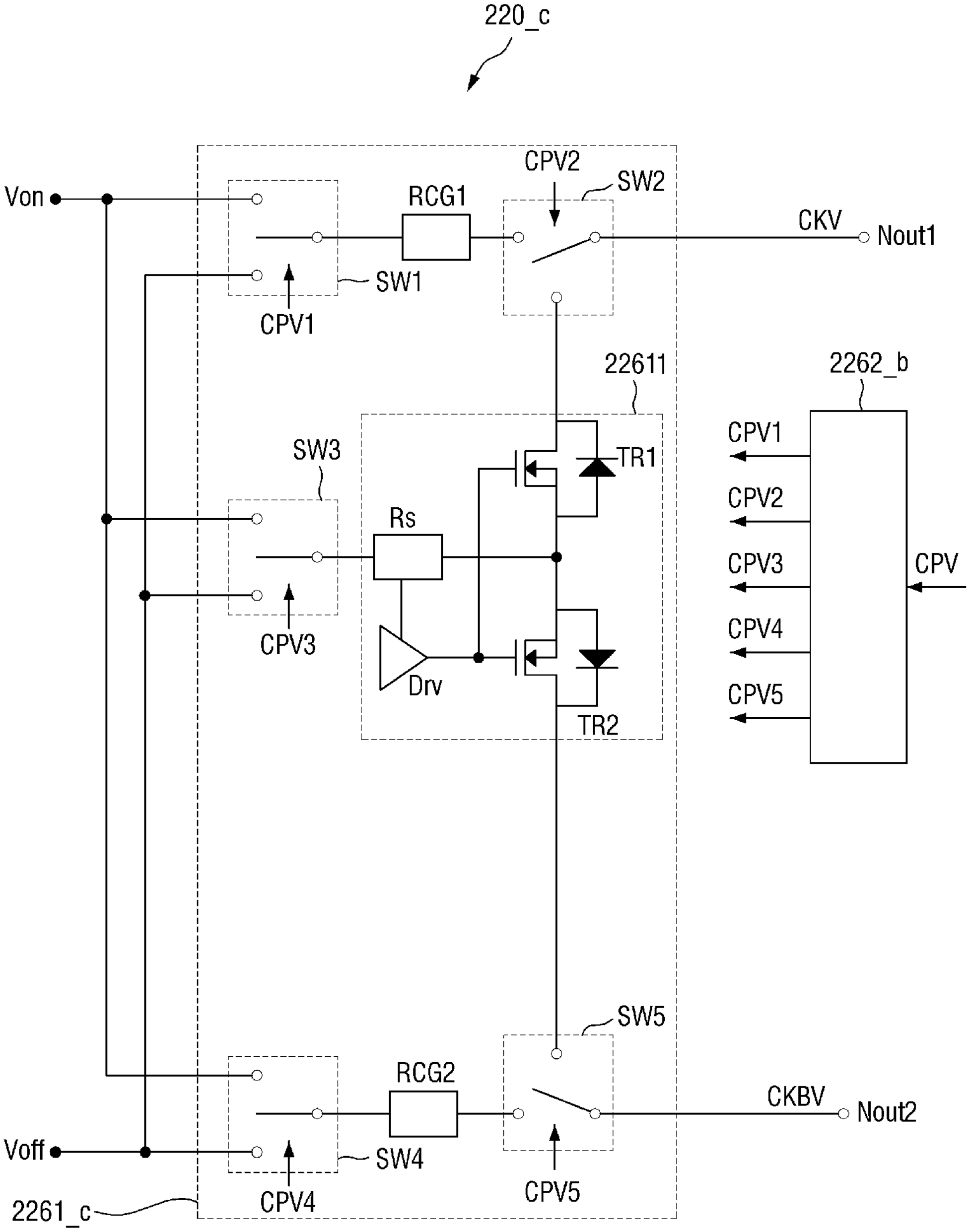
FIG. 7 is a block diagram of still another exemplary embodiment of a clock generator of a display device according to the invention.

FIG. 7 is a block diagram of still another exemplary embodiment of a clock generator of a display device according to the invention.

A clock generator 220_*c* according to the exemplary embodiment of FIG. 7 has almost the same structure as the clock generator 220_*b* of FIG. 5 except for the locations of first and second impedance control circuits RCG1 and RCG2. Accordingly, the clock generator 220_*c* will hereinafter be described, focusing mainly on the difference from the clock generator 220_*b*.

Referring to FIG. 7, the clock generator 220_*c* includes a gate clock generator 2261_*c* and a control signal generator 2262_*b*.

The gate clock generator 2261_*c* includes first through fifth switching circuits SW1 through SW5, a charge sharer 22611, and the first and second impedance control circuits RCG1 and RCG2.

The first impedance control circuit RCG1 is connected between the first and second switching circuits SW1 and SW2. The second impedance control circuit RCS2 is connected between the fourth and fifth switching circuits SW4 and SW5.

The first impedance control circuit RCG1 may control the slew rate of a gate clock signal CKV during periods when charging is performed such that the gate clock signal CKV swings from a reference voltage to a gate-on voltage Von and when charging is performed such that the gate clock signal CKV swings from a reference voltage to a gate-off voltage Voff. Specifically, the higher the impedance of the first impedance control circuit RCG1 is, the lower the slew rate of the gate clock signal CKV is, and the lower the impedance of the first impedance control circuit RCG1 is, the higher the slew rate of the gate clock signal CKV is.

The second impedance control circuit RCG2 may control the slew rate of a gate clock bar signal CKBV during periods when charging is performed such that the gate clock bar signal CKBV swings from the reference voltage to the gate-on voltage Von and when charging is performed such that the gate clock bar signal CKBV swings from the reference voltage to the gate-off voltage Voff. Specifically, the higher the impedance of the second impedance control circuit RCS2 is, the lower the slew rate of the gate clock bar signal CKBV is, and the lower the impedance of the second impedance control circuit RCS2 is, the higher the slew rate of the gate clock bar signal CKBV is.

The gate clock signal CKV of FIG. 7 will hereinafter be described with reference to FIG. 8.

Figure 8:
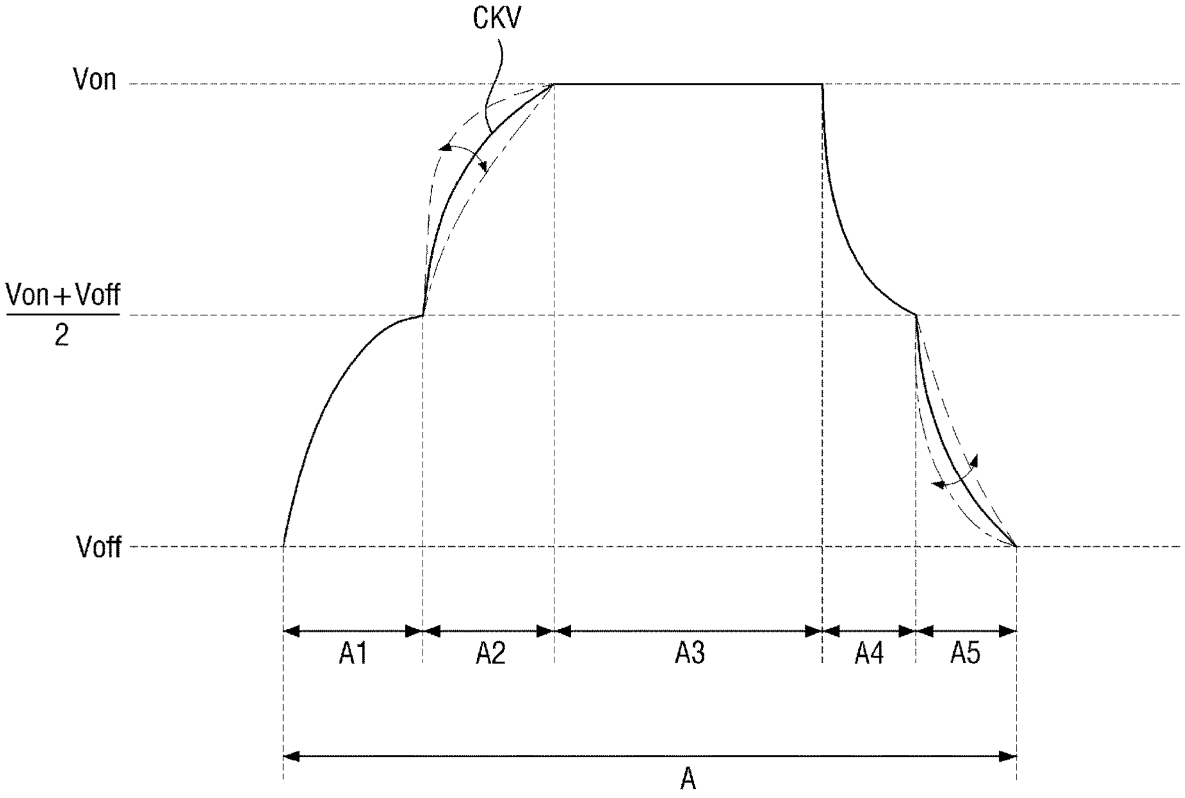
FIG. 8 is a waveform diagram showing an exemplary embodiment of the waveform of a gate clock signal generated by the clock generator of FIG. 7 during a period corresponding to the period A of FIG. 2.

FIG. 8 is a waveform diagram showing an exemplary embodiment of the waveform of the gate clock signal generated by the clock generator of FIG. 7 during a period corresponding to the period A of FIG. 2.

Referring to FIG. 8, a period A may be divided into a total of five sections, i.e., sections A1 through A5, for example. The sections A1 through A5 of FIG. 8 are the same as their respective counterparts of FIG. 6, and thus, detailed descriptions thereof will be omitted.

Among the sections A1 through A5, swings of the gate clock signal CKV that result from charging using the gate-on voltage Von and discharging using the gate-off voltage Voff may occur only during the sections A2 and A5.

As the impedance of the first impedance control circuit RCG1 of FIG. 7 decreases, the gate clock signal CKV may increase faster during the section A2, and may decrease faster during the section A5. That is, the response speed, the slew rate, of the gate clock signal CKV increase. On the other hand, as the impedance of the first impedance control circuit RCG1 of FIG. 7 increases, the gate clock signal CKV may increase more slowly during the section A2, and may decrease more slowly during the section A5. That is, the response speed, the slew rate, of the gate clock signal CKV may decrease.

In an exemplary embodiment, resistors, inductors, capacitors, operational amplifiers, and voltage followers using emitter followers may be used as the first and second impedance control circuits RCG1 and RCG2 of FIG. 7, for example, and any circuit configurations that can provide a desired impedance value may be used as the first and second impedance control circuits RCG1 and RCG2 of FIG. 7.

Figure 9:
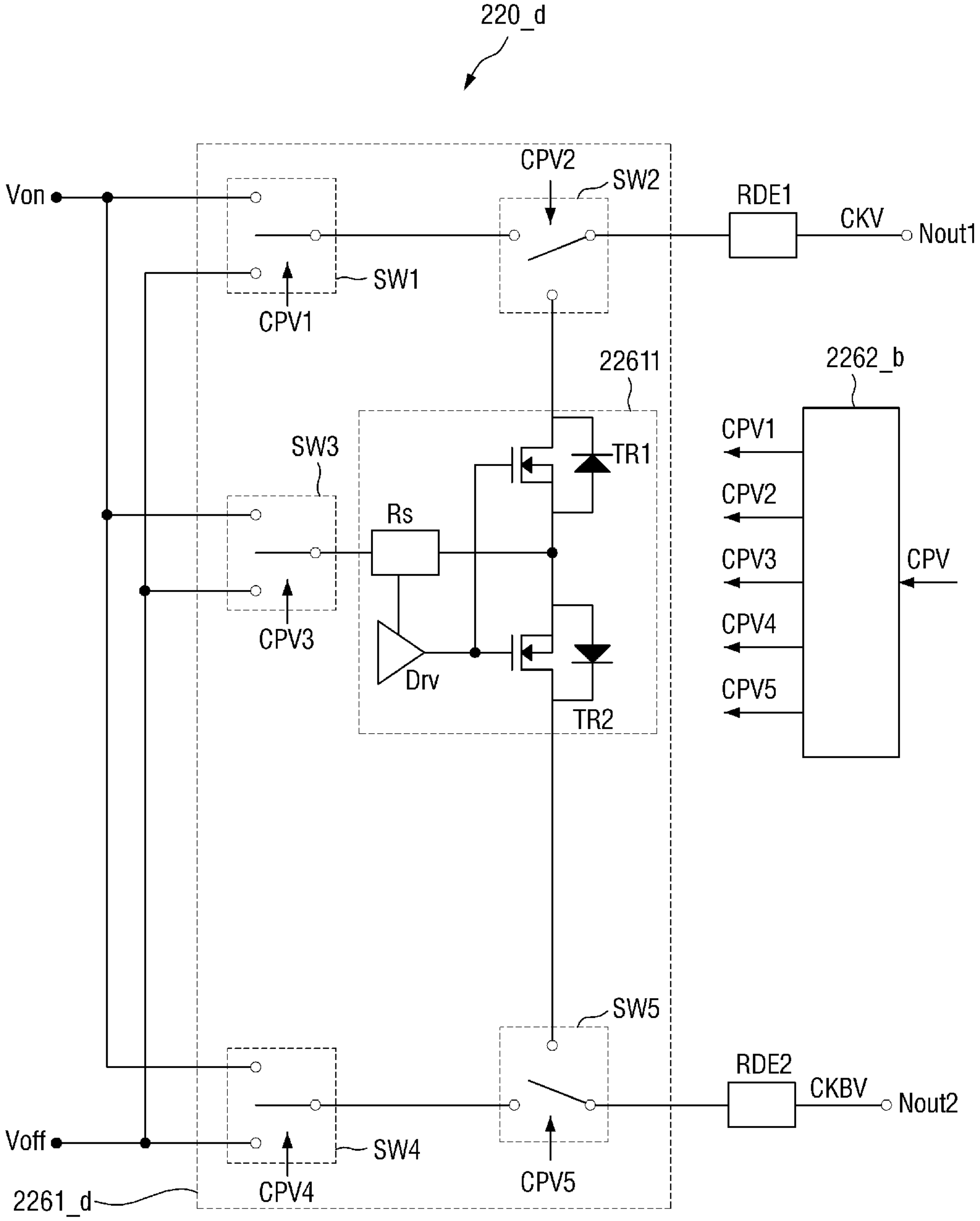
FIG. 9 is a block diagram of still another exemplary embodiment of a clock generator of a display device according to the invention.

FIG. 9 is a block diagram of still another exemplary embodiment of a clock generator of a display device according to the invention.

A clock generator 220_*d* according to the exemplary embodiment of FIG. 9 has almost the same structure as the clock generator 220_*b* of FIG. 5 except for the locations of first and second impedance control circuits RDE1 and RDE2. Accordingly, the clock generator 220_*d* will hereinafter be described, focusing mainly on the difference from the clock generator 220_*b*.

Referring to FIG. 9, the clock generator 220_*d* includes a gate clock generator 2261_*d* and a control signal generator 2262_*b*.

The gate clock generator 2261_*d* includes first through fifth switching circuits SW1 through SW5, a charge sharer 22611, and the first and second impedance control circuits RDE1 and RDE2.

The first impedance control circuit RDE1 is connected between the second switching circuit SW2 and a first output terminal Nout1 of the clock generator 220_*d*. The second impedance control circuit RDE2 is connected between the fifth switching circuit SW5 and a second output terminal Nout2 of the clock generator 220_*d*.

The first impedance control circuit RDE1 may advance the gate clock signal CKV or delay the gate clock signal CKV.

The second impedance control circuit RDE2 may advance the gate clock bar signal CKBV or delay the gate clock signal CKV.

Accordingly, if any one of the gate clock signal CKV and the gate clock bar signal CKBV is delayed or advanced such that the gate clock signal CKV and the gate clock bar signal CKBV are no longer matched, the gate clock signal CKV or the gate clock bar signal CKBV may be delayed or advanced to be re-matched by controlling the impedances of the first and second impedance control circuits RDE1 and RDE2.

The delaying of the gate clock signal CKV of FIG. 9 will hereinafter be described with reference to FIGS. 10 and 11.

Figure 10:
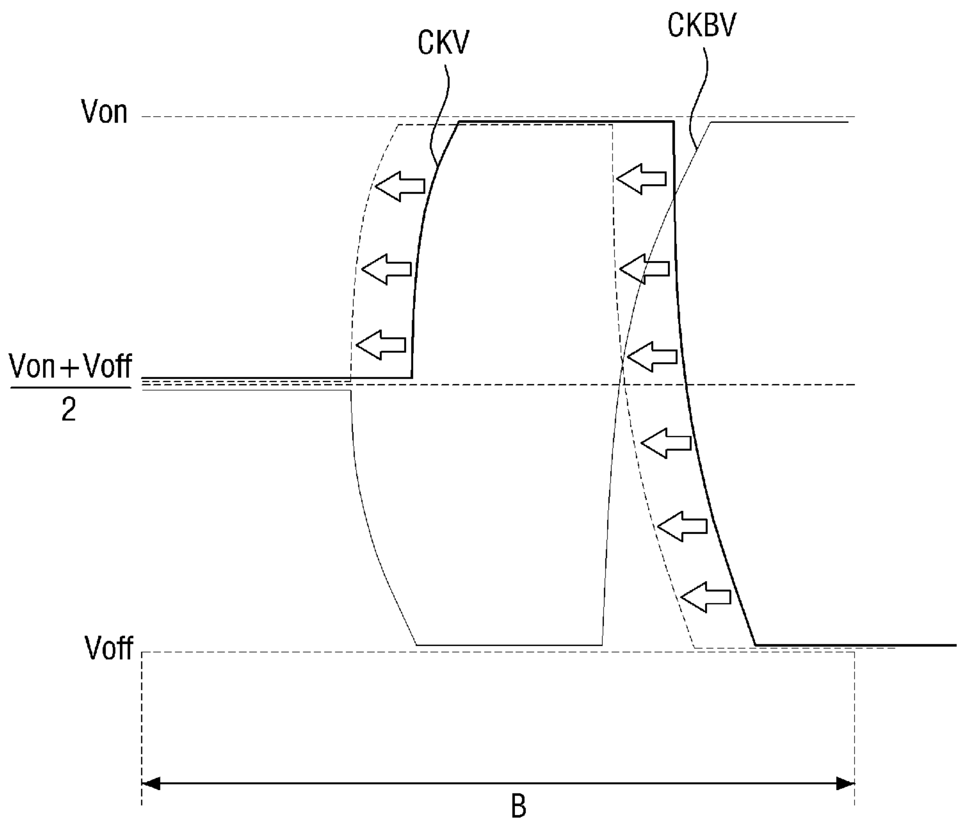
FIGS. 10 and 11 are waveform diagrams showing exemplary embodiments of the waveforms of a gate clock signal generated by the clock generator of FIG. 9 during a period corresponding to a period B of FIG. 2.
Figure 11:
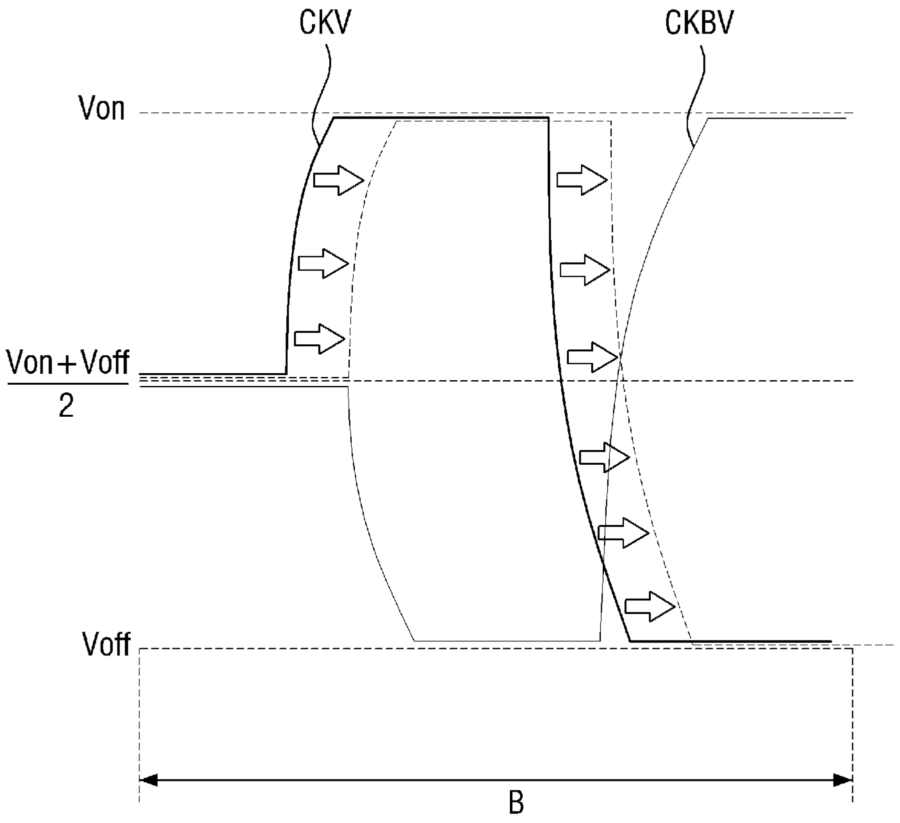

FIGS. 10 and 11 are waveform diagrams showing exemplary embodiments of the waveforms of the gate clock signal generated by the clock generator 220_*d* of FIG. 9 during a period corresponding to a period B of FIG. 2.

Referring to FIG. 10, during a period B, the gate clock signal CKV lags behind the gate clock bar signal CKBV. In this case, if the impedance of the first impedance control circuit RDE1 of FIG. 9 may be decreased, and as a result, the gate clock signal CKV may be advanced. Consequently, the gate clock signal CKV and the gate clock bar signal CKBV may be restored back to be matched.

Referring to FIG. 11, during a period B, the gate clock signal CKV leads the gate clock bar signal CKBV. In this case, if the impedance of the first impedance control circuit RDE1 of FIG. 9 may be increased, and as a result, the gate clock signal CKV may be delayed. Consequently, the gate clock signal CKV and the gate clock bar signal CKBV may be restored back to be matched.

Figure 12:
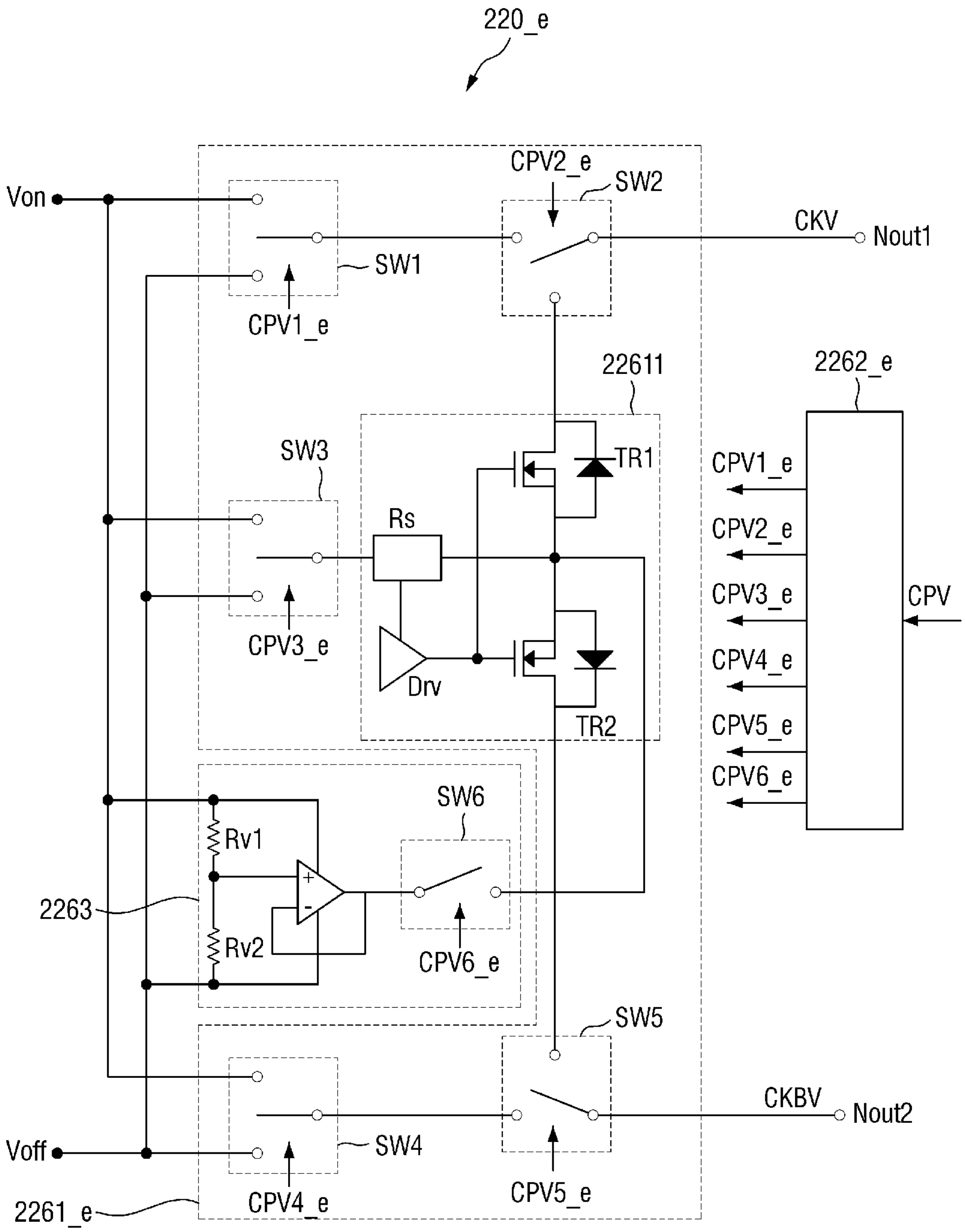
FIG. 12 is a block diagram of still another exemplary embodiment of a clock generator of a display device according to the invention.

FIG. 12 is a block diagram of still another exemplary embodiment of a clock generator of a display device according to the invention.

A clock generator 220_*e* according to the exemplary embodiment of FIG. 12 has almost the same structure as the clock generator 220 of FIG. 2 except for the waveforms of first through sixth gate pulse signals CPV1_*e* through CPV6_*e*. Accordingly, the clock generator 220_*e* will hereinafter be described, focusing mainly on the difference from the clock generator 220 of FIG. 2.

Referring to FIG. 12, the clock generator 220_*e* includes a gate clock generator 2261_*e*, a control signal generator 2262_*e*, and a voltage maintainer 2263.

The control signal generator 2262_*e* receives a gate pulse signal CPV from the signal controller 210 of FIG. 1 and generates the first through sixth gate pulse signals CPV1_*e* through CPV6_*e*. The first through sixth gate pulse signals CPV1_*e* through CPV6_*e* may slightly differ from the first through sixth gate pulse signals CPV1 through CPV6, respectively, of FIG. 2. Accordingly, in the exemplary embodiment of FIG. 13, unlike in the exemplary embodiment of FIG. 2, a gate clock signal CKV may be controlled to swing ahead of a gate clock bar signal CKBV, and then, the gate clock bar signal CKBV may be controlled to swing. The gate clock signal CKV and the gate clock bar signal CKBV of FIG. 12 will hereinafter be described with reference to FIG. 13.

Figure 13:
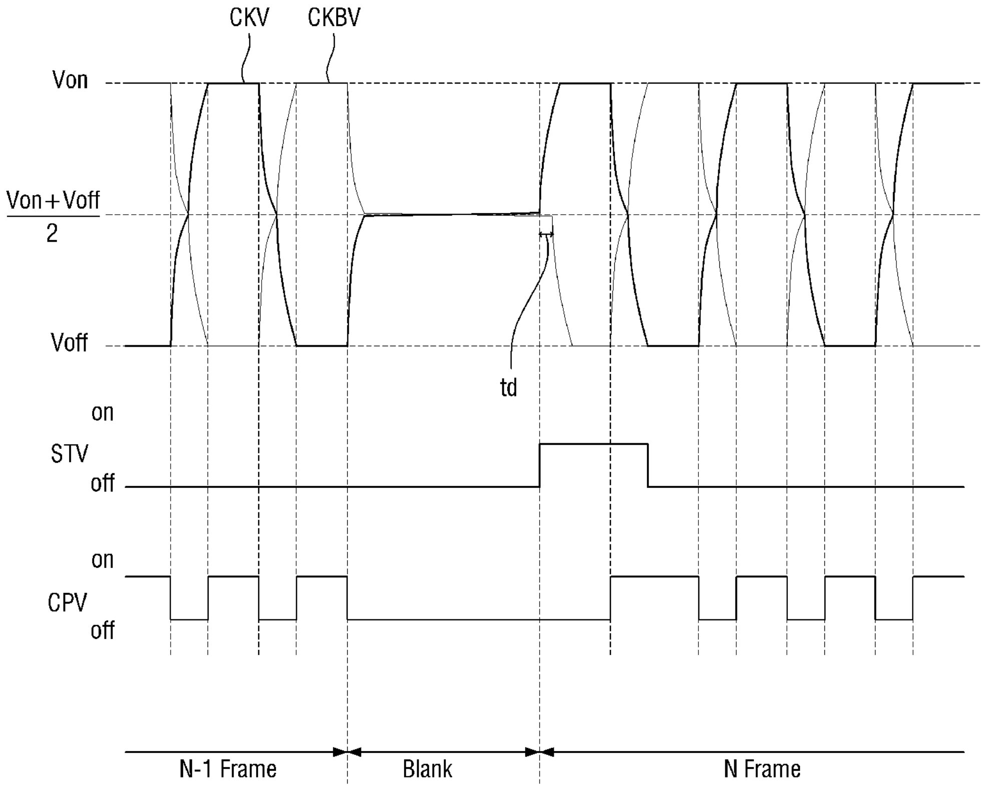
FIG. 13 is a waveform diagram showing an exemplary embodiment of the waveforms of a gate clock signal and a gate clock bar signal generated by the clock generator of FIG. 12.

FIG. 13 is a waveform diagram showing an exemplary embodiment of the waveforms of the gate clock signal and the gate clock bar signal generated by the clock generator of FIG. 12.

Referring to FIG. 13, a blank period "Blank" follows a previous frame "N−1 Frame", and when the blank period "blank" ends, a gate clock signal CKV and a gate clock bar signal CKBV begin to swing again. The gate clock bar signal CKBV may swing with a time delay of a predetermined amount of time td. Accordingly, it is possible to reduce an overload applied to the clock generator 220_*e* of FIG. 12.

In this exemplary embodiment, the gate clock signal CKV and the gate clock bar signal CKBV sequentially swing rather than simultaneously swing at the beginning of a frame, but the invention is not limited thereto. In general, when a user turns on a display device that was completely off, control signals for controlling various elements of the display device begin to swing. In this case, like the exemplary embodiment of FIG. 12, if the gate clock signal CKV and the gate clock bar signal CKBV are driven to sequentially swing, not simultaneously swing, an overload applied to the display device can be reduced.

Also, FIGS. 12 and 13 illustrate an example in which the clock generator 220_*e* of FIG. 12 generates a pair of clock signals, i.e., the gate clock signal CKV and the gate clock bar signal CKBV, and the gate clock signal CKV and the gate clock bar signal CKBV sequentially swing, but the invention is not limited thereto. That is, in an alternative embodiment, the clock generator 220_*e* may generate two pairs of clock signals, i.e., a first gate clock signal (not illustrated), a second gate clock signal (not illustrated), a first gate clock bar signal (not illustrated), and a second gate clock bar signal (not illustrated). In this case, the sequence of swing may follow an order of the first gate clock signal, the second gate clock signal, the first gate clock bar signal, and the second gate clock bar signal, for example.

However, the embodiments of the invention are not restricted to the exemplary embodiments set forth herein. The above and other effects of the invention will become more apparent to persons of ordinary skill in the art to which the inventive concept pertains by referencing the claims.

What is claimed is:

1. A display device, comprising:

a display panel including a plurality of pixels which are connected to a plurality of gate lines and a plurality of data lines and display a plurality of consecutive frames of images;

a data driver which drives the data lines;

a gate driver which drives the gate lines;

a clock generator which outputs a gate clock signal which drives the gate driver and swings between a gate-on voltage and a gate-off voltage; and a signal controller which outputs a gate pulse signal which drives the clock generator and a data control signal which controls the data driver, wherein the clock generator comprises:

a charge sharer which provides a voltage which swings between the gate-on voltage and the gate-off voltage, the charge sharer comprising first and second transistors connected in series with each other;

a first switching circuit which provides one of the gate-on voltage and the gate-off voltage in response to the gate pulse signal, an impedance control circuit which is configured to delay the gate clock signal in a first period and advance the gate clock signal in a second period, and a second switching circuit which connects the impedance control circuit to one of the first transistor of the charge sharer and the first switching circuit, wherein the gate clock signal includes a first gate clock signal and a second gate clock signal, and the impedance control circuit re-matches the first and second gate clock signals by one of delaying or advancing one of the first and second gate clock signals during a period, which is after a manufacturing process of the display device, between consecutive frames of the plurality of consecutive frames that form the images displayed on the display device.

2. The display device of claim 1, wherein the clock generator further includes a gate clock generator which generates the gate clock signal using the gate-on voltage and the gate-off voltage.

3. The display device of claim 1, wherein the impedance control circuit is connected between the second switching circuit and an output terminal of the clock generator.

* * * * *